United States Patent [19]
Fontana et al.

[11] Patent Number: 5,802,701
[45] Date of Patent: Sep. 8, 1998

[54] METHOD OF MAKING AN INTEGRATED SUSPENSION, ACTUATOR ARM AND COIL ASSEMBLY

[75] Inventors: Robert E. Fontana; James W. Berberich; Michael Anthony Moser; Archibald Currie Munce, Jr.; Oscar J. Ruiz, all of San Jose; Clinton David Snyder, Los Gatos, all of Calif.; C. E. Yeack-Scranton, deceased, late of San Jose, Calif., by Robert A. Scranton, spouse and trustee of the Scranton trust

[73] Assignee: International Business Machines Corporation, Armonk, N.Y.

[21] Appl. No.: 627,161

[22] Filed: Apr. 3, 1996

Related U.S. Application Data

[62] Division of Ser. No. 366,282, Dec. 29, 1994, Pat. No. 5,539,596.

[51] Int. Cl.⁶ ............................................. G11B 5/127
[52] U.S. Cl. ............................... 29/603.14; 29/603.03; 29/603.13
[58] Field of Search ............................ 29/603.03, 603.11, 29/603.12, 603.13, 603.14; 360/104, 105, 106

[56] References Cited

U.S. PATENT DOCUMENTS

| | | | |
|---|---|---|---|
| 3,908,194 | 9/1975 | Romankiw | 360/113 |
| 4,314,295 | 2/1982 | Frandsen | 360/106 |
| 4,761,699 | 8/1988 | Ainslie et al. | 360/103 |
| 4,809,103 | 2/1989 | Lazzari | 360/103 |
| 4,996,623 | 2/1991 | Erpelding et al. | 360/104 |
| 5,041,932 | 8/1991 | Hamilton | 360/104 |
| 5,134,532 | 7/1992 | Svendsen et al. | 360/106 |
| 5,140,482 | 8/1992 | Kimura et al. | 360/104 |
| 5,282,103 | 1/1994 | Hatch et al. | 360/104 |
| 5,452,151 | 9/1995 | Money et al. | 360/104 X |
| 5,491,597 | 2/1996 | Bennin et al. | 360/104 |
| 5,528,819 | 6/1996 | McKay et al. | 29/603.12 X |
| 5,557,152 | 9/1996 | Gauthier | 360/104 X |
| 5,560,097 | 10/1996 | Bajhorek et al. | 29/603.12 |

FOREIGN PATENT DOCUMENTS 0 203 204 A1  6/1986  European Pat. Off. .

OTHER PUBLICATIONS

"Integrated Head Actuator Assembly with Voice Coil on Mount Plate", IBM Technical Disclosure Bulletin, vol. 38, No. 03, Mar. 1995.

"Combination Suspension–Lead Cable for a Multi–Gap Read/Write Head", J. R. Reidenbach, IBM Technical Disclosure Bulletin, vol. 24, No. 04, Sep. 1979.

"Printed Circuit Armature Commutators", G.G. Chase and J.E. Parker, *IBM Technical Disclosure Bulletin*, vol. 13, No. 4, Sep. 1970.

"Low–Inertia Stepping Motor with Moving–Coil Armature", A.W. Orlando, F.A. Schultz and J.A. Weidenhammer, *IBM Technical Disclosure Bulletin*, vol. 14, No. 7, Dec. 1971.

*Primary Examiner*—S. Thomas Hughes
*Attorney, Agent, or Firm*—Baker, Maxham, Jester & Meador

[57] ABSTRACT

A method is provided for making an assembly that has an integrated suspension, actuator arm and actuator coil. At least one actuator coil layer is located in the actuator arm region. The actuator coil layer is mounted to at least one homogeneous support layer which extends between terminal ends of the assembly for supporting all layers. A hole is provided through all layers in the actuator region at a pivot point for receiving an actuator spindle. In some embodiments of the invention, a transducer coil layer may be integrated in the suspension region and may be located in substantially a common plane with the actuator coil layer. The actuator region may be provided with a silicon base which contains integrated processing circuits which are connected to the transducer coil layer. A device may be carried by the assembly for bending the suspension region with respect to the actuator arm region. A method is provided for fabricating multiple integrated assemblies substantially entirely at the wafer level, each integrated assembly having a longitudinal recording magnetic head which has a close tolerance gap.

23 Claims, 14 Drawing Sheets

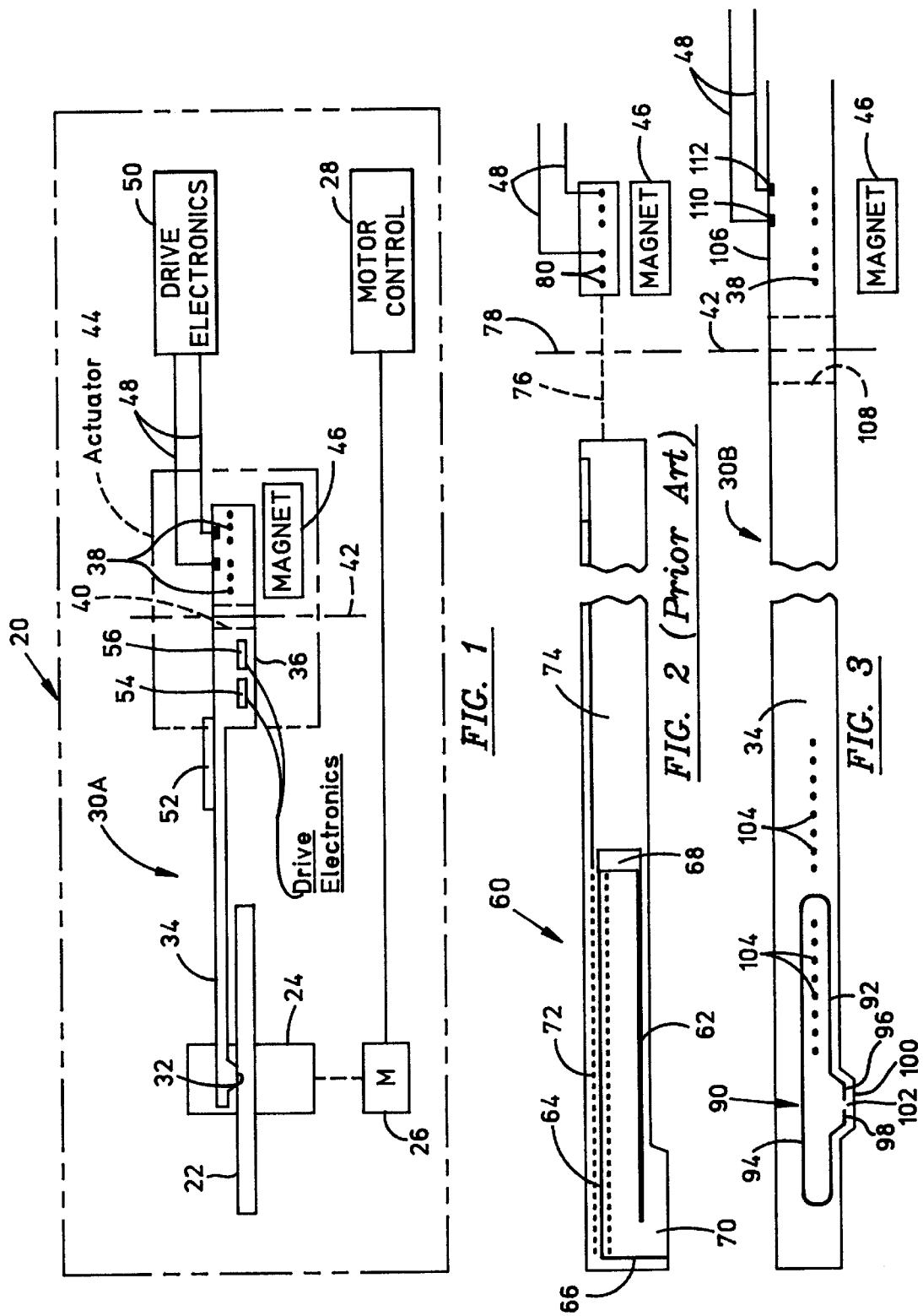

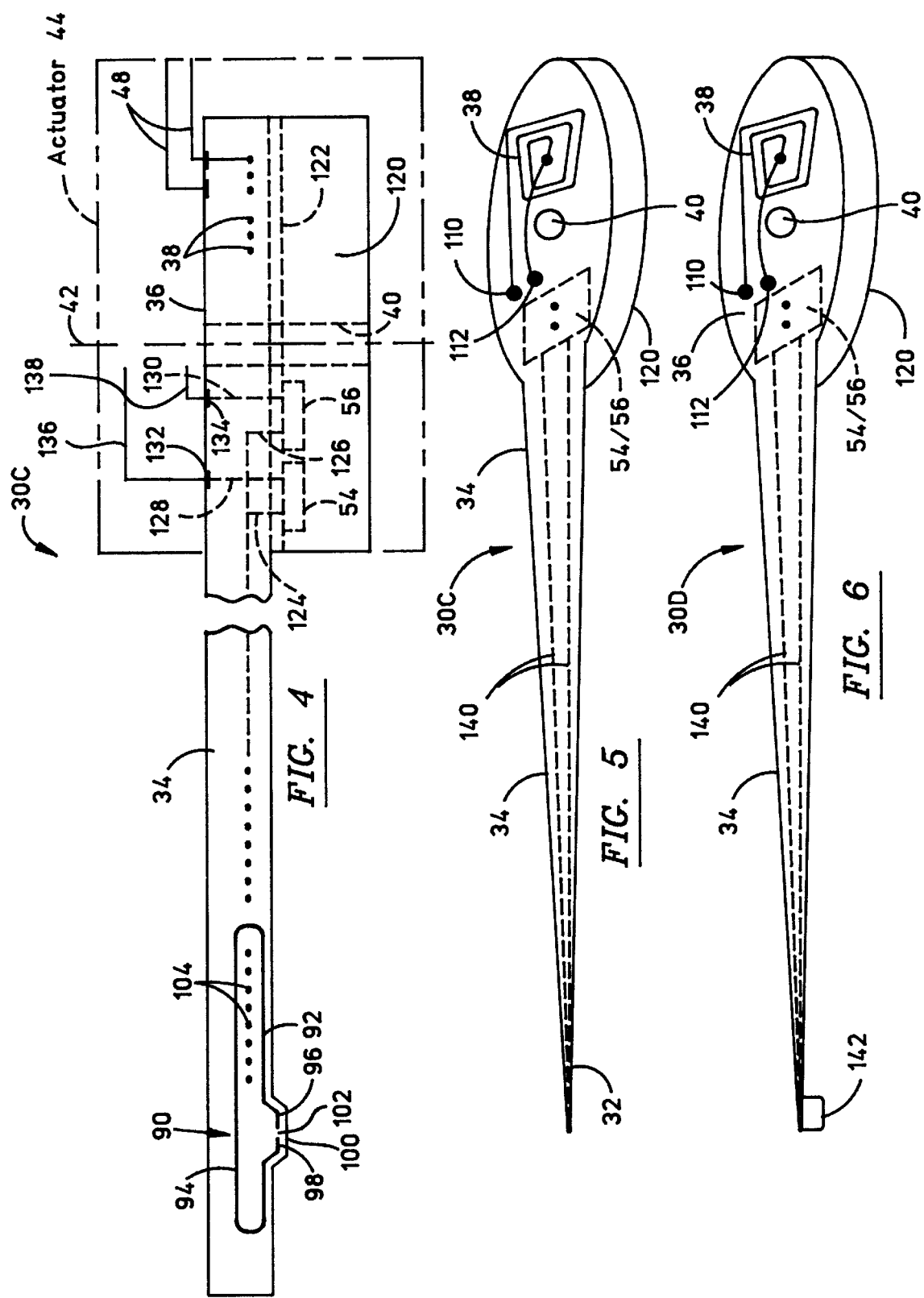

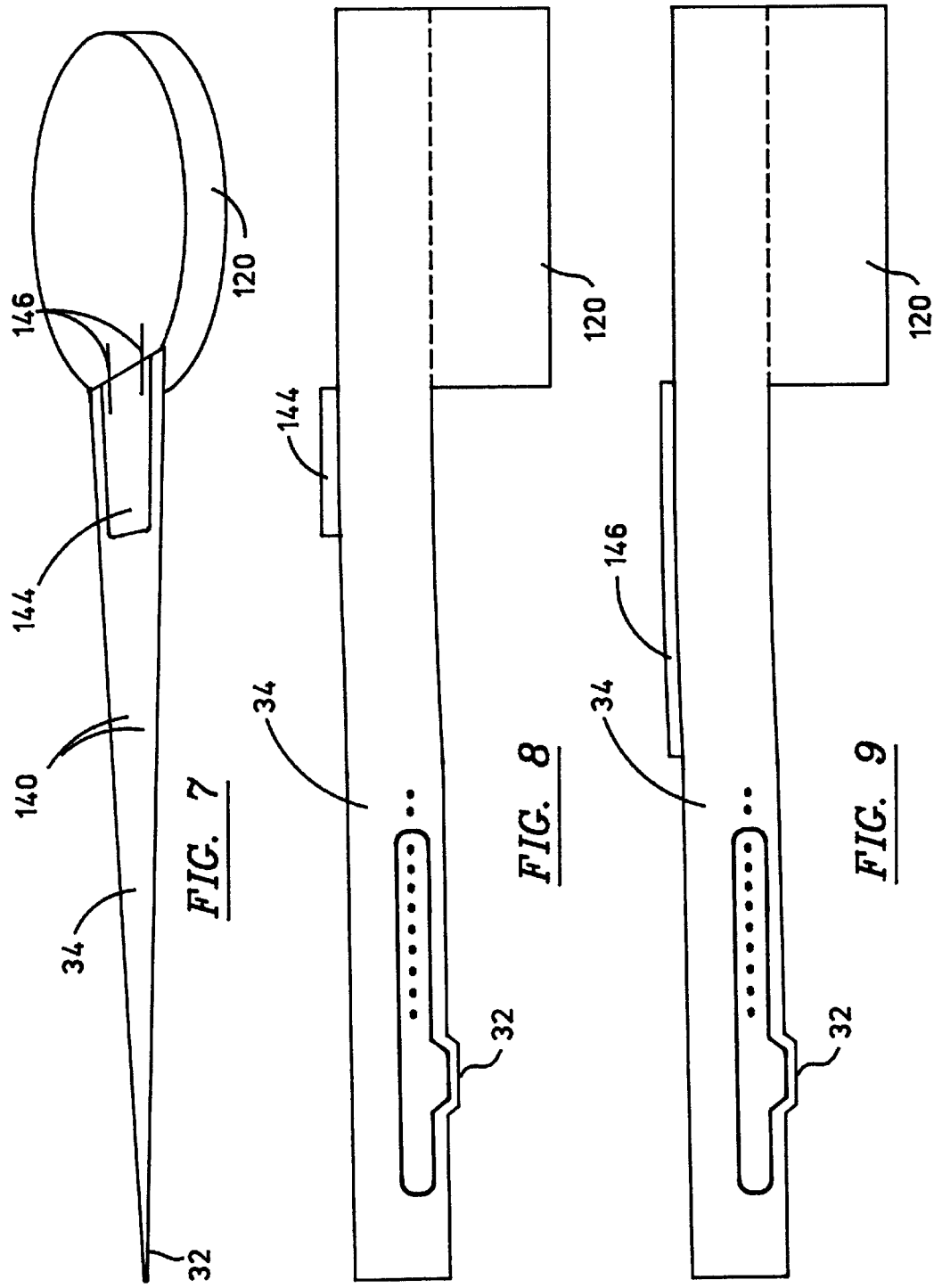

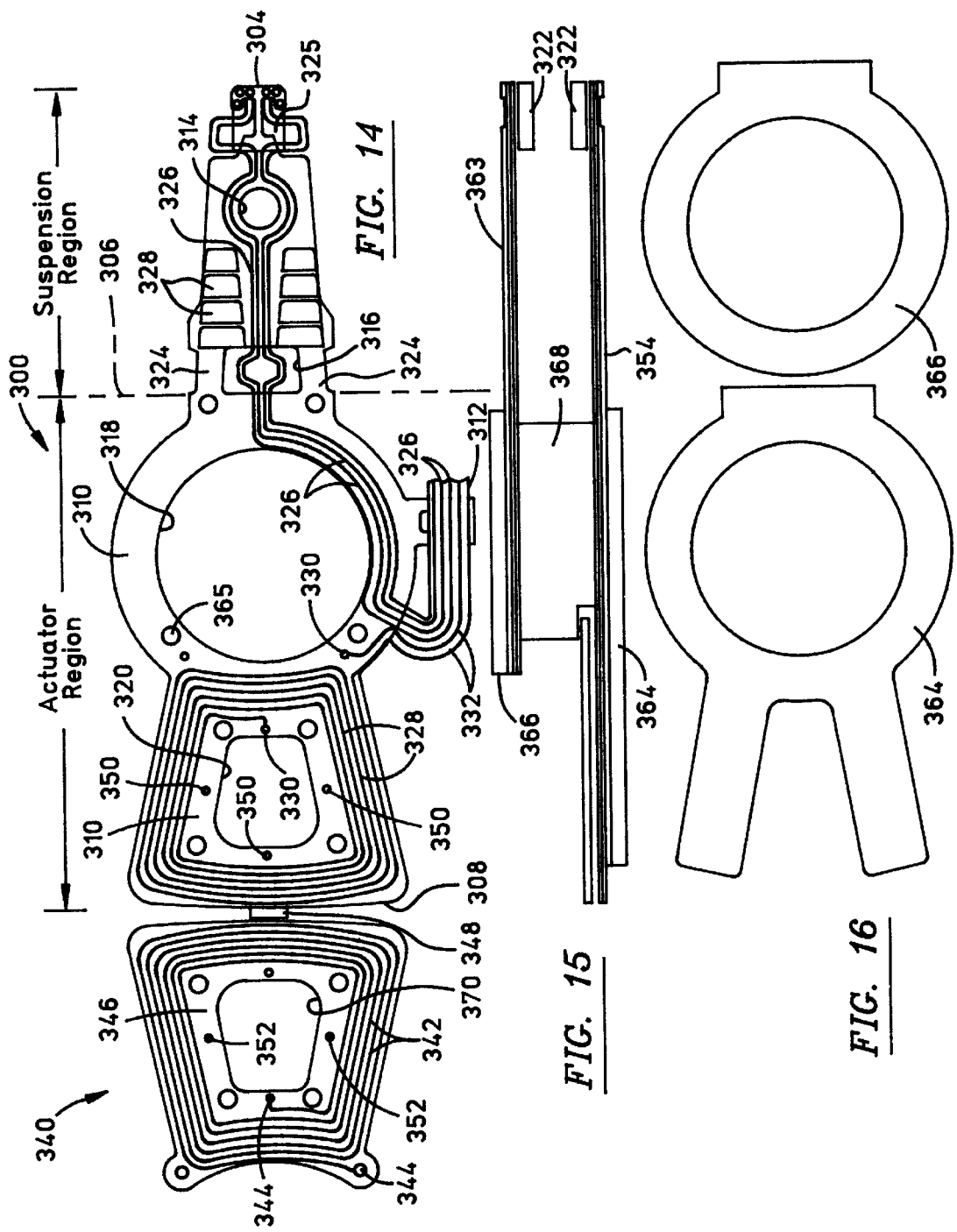

METHOD OF MAKING AN INTEGRATED SUSPENSION, ACTUATOR ARM AND COIL ASSEMBLY

CROSS-REFERENCE TO RELATED APPLICATIONS

This is a divisional application of application Ser. No. 08/366,282 filed Dec. 29, 1994, now U.S. Pat. No. 5,539, 596.

The following commonly assigned applications provide background for the present invention and are incorporated by reference herein:

"Integrated Transducer/Slider/Suspension Assembly", Ser. No. 08/202,862, filed Feb. 25, 1994 (continuation of Ser. No. 07/876,533 filed Apr. 30, 1992, now abandoned);

"Integrated Transducer-Suspension structure for Longitudinal Recording", U.S. Pat. No. 5,486,963;

"Magnetic Head for Recording with Ultra Low Force", Ser. No. 08/259,370 filed Jun. 14, 1994 (continuation of Ser. No. 07/935,000 filed Aug. 25, 1992);

"Method of Making Integral Transducer-Suspension Assemblies for Longitudinal Recording", U.S. Pat. No. 5,454,158; and "Integrated Transducer-Suspension Assembly for Vertical Recording", U.S. Pat. No. 5,408,373.

BACKGROUND OF THE INVENTION

1. Field of the Invention

The present invention relates to a method of making an integrated suspension, actuator arm and a coil assembly for a magnetic disk drive.

2. Description of Related Art

A disk drive performs recording and reading of signals on a magnetic storage disk. The magnetic disk is rotated by a spindle while a magnetic head contacts the surface of the disk or flies over the surface of the disk on a very thin layer of air (air bearing) created by the high speed movement of the disk. The magnetic head is mounted on a suspension which is pre-loaded to slightly urge the magnetic head against the surface of the disk. This force is balanced by the force of the air bearing to maintain the desired contact pressure or flying height.

In addition to the magnetic head and suspension the drive includes an actuator. The actuator typically employs an actuator arm and a voice coil motor for implementing movements of the suspension and magnetic head. The voice coil motor includes a moving coil and a fixed magnet. In a rotary actuator one end of the actuator arm is mounted to the suspension and the other end of the arm is pivoted and carries the actuator coil. The amount of current applied to the coil determines the movement of the arm and the placement of the magnetic head with respect to the surface of the magnetic disk.

Magnetic heads record either horizontally or vertically, the horizontal recording head being the most prevalent. The horizontal recording head has a pair of pole tips which generate flux in a very thin gap, the fringe flux magnetizing a surface of the disk with desired signals. In the vertical recording head flux is transferred horizontally through the disk between spaced apart pole tips, the horizontally transferred flux magnetizing the disk with desired signals. A major structural difference between horizontal and vertical recording heads is that the horizontal recording head has a precisely defined gap between the pole tips which is typically 2–3 microns thick. Accordingly, the gap must be carefully fabricated by thin film deposition.

U.S. Pat. No. 5,041,932 teaches the fabrication of a perpendicular recording head and suspension which are integrated into a unitary structure. The magnetic head is essentially embedded in one end of the suspension and the other end of the suspension attaches to an actuator arm. Fabrication of the integrated perpendicular recording head and suspension has to be partially completed at the row level. Row level fabrication is necessary in order to lap for throat height and form a vertical portion of a second pole piece of the perpendicular recording head. This process significantly lessens production throughput. The patent does not teach how to fabricate an integrated horizontal recording head and suspension with a precisely defined gap at the recording head surface. The lapping step in the patent cannot be sufficiently controlled to make gaps with thicknesses in the order of 2–3 microns. In addition to constructing the integrated head and suspension the actuator arm and coil have to be constructed. The coil is then assembled to one end of the actuator arm and the suspension is mounted to the other end of the actuator arm. These are labor intensive operations.

There is a strongly felt need to provide integrated magnetic recording head, suspension, actuator arm and actuator coil assemblies which can be fabricated substantially entirely at the wafer level. This would eliminate the labor intensive steps of fabricating separate components and then assembling the components. Further, it is important that the gap of the magnetic head be precisely formed for a longitudinal recording head. There is also a strongly felt need to provide integrated suspension, actuator arm and actuator coil assemblies at the batch level which can be subsequently assembled to a magnetic head and slider.

SUMMARY OF THE INVENTION

The present invention provides an integrated magnetic recording head, suspension, actuator arm and actuator coil which can be fabricated entirely at the wafer level. After providing a first layer, first and second pole pieces are formed which have horizontally directed pole tips. The pole tips are separated by a thin gap at the recording head surface. The coils of the magnetic head and the actuator may be simultaneously formed in one step. Between the pole pieces and coils and on top of the coils are layers of supporting material, such as alumina, which provides a support layer for the integrated assembly. The actuator arm may be formed on a silicon base which carries integrated drive and control circuits for the magnetic head. The actuator arm can be patterned with a hole for a pivot connection in the actuator. The labor of separately making an actuator arm and actuator coil and then assembling the actuator arm, actuator coil and suspension are eliminated. Further, by integrating a horizontal recording head in the assembly the thickness of the gap at the recording head surface can be accurately controlled. In a another embodiment of the invention an integrated suspension, actuator arm and actuator coil assembly are fabricated at the wafer or panel level and then subsequently combined with a magnetic head and slider. In this arrangement leads for the magnetic head can be integrated in the suspension. The support layer for this embodiment can be a bottom steel layer of a special laminate or subsequently formed top layers.

An object of the present invention is to provide an integrated magnetic head, suspension, actuator arm and actuator coil for a disk drive.

Another object is to accomplish the previous object with the addition of a silicon layer which contains circuits for connection to magnetic head components.

A further object is to increase production throughput of disk drive components.

Yet another object is to provide an integrated horizontal recording head with a precisely defined gap, suspension, actuator arm and actuator coil which can be fabricated substantially entirely at the wafer level.

Still another object is to provide an integrated suspension, actuator arm and actuator coil assembly which can be combined with a magnetic head and slider.

Still a further object is to provide an actuator which has a thin film actuator coil.

Still another object is to provide a method of making an integrated suspension, actuator arm and actuator coil.

Other objects and advantages of the invention will become more apparent to one skilled in the art upon reading the following description with reference to the accompanying drawings.

DESCRIPTION OF THE DRAWINGS

FIG. 1 is a schematic illustration of an exemplary drive employing the integrated assembly of the present invention.

FIG. 2 is vertical cross section of a prior art integrated assembly which is connected to an actuator.

FIG. 3 is a vertical cross section of one embodiment of the present integrated assembly which includes an actuator arm and an actuator coil.

FIG. 4 is a vertical cross section of another embodiment of the present integrated assembly similar to the embodiment in FIG. 3 except an actuator arm portion of the assembly includes a silicon base which carries integrated processing circuits.

FIG. 5 is an isometric view of the embodiment shown in FIG. 4.

FIG. 6 is an isometric view of still another embodiment of the present invention which is similar to the embodiment shown in FIG. 5 except a magnetic head is added as a chiplet to the integrated assembly.

FIG. 7 is a schematic isometric illustration of the integrated assembly with a piezoelectric layer for bending a suspension region of the assembly.

FIG. 8 is a vertical side view of the integrated assembly showing the piezoelectric layer of FIG. 7 imbedded in the assembly.

FIG. 9 is a vertical side view of the integrated assembly showing a bent strip of resilient material attached to the assembly for bending a suspension region of the assembly.

FIG. 14 is a top planar schematic illustration of another embodiment of the present invention which employs a laminated panel.

FIG. 15 is a side elevation view of the embodiment shown in FIG. 14 combined with a similar embodiment, the combination being joined by mounting plates and a spacer so that top and bottom magnetic heads can read top and bottom surfaces of a rotating magnetic disk.

FIG. 16 is a top planar view of the mounting plates employed for the combination shown in FIG. 15.

DESCRIPTION OF THE PREFERRED EMBODIMENTS

Figure 10A:
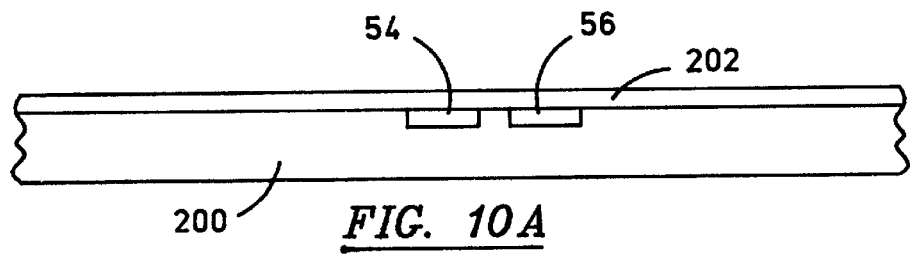
FIGS. 10A–10L illustrate a series of steps in the fabrication of the embodiment of the invention illustrated in FIG. 4.

Referring now to the drawings wherein like reference numerals designate like or similar parts throughout the several views, there is illustrated in FIG. 1 a magnetic disk drive which includes a magnetic disk 22 which is supported by a spindle 24, the spindle 24 and the disk 22 being rotated by a motor 26 which is controlled by motor control 28. An integrated magnetic head, suspension, actuator arm and coil assembly, hereinafter referred to as integrated assembly 30A, is employed for writing and reading signals on the surface of the magnetic disk 22. The integrated assembly 30A includes a magnetic head 32 which is integrated with a suspension arm 34, the suspension arm 34 being integrated with an actuator arm 36 and the actuator arm 36 being integrated with one or more layers of actuator coils 38. The actuator arm has a hole 40 which receives an actuator spindle 42 so that the arm 36, the suspension 34 and the magnetic head 32 can be rotated to place the magnetic head 32 over various circular data and servo tracks on the magnetic disk. The actuator is generally shown within block 44. A component of the actuator which is not part of the integrated assembly 30A is a magnet 46 which is positioned adjacent the coils 38. When the coils 38 are energized via leads 48, the integrated assembly 30A is selectively rotated about the spindle axis 42. Drive electronics 50 selectively energizes the coil 38 via leads 48 and transmits and receives write and read signals from the magnetic head 32. The integrated assembly 30A may further include a downwardly biased beam 52 which is mounted at the top of the suspension and the actuator arm for downwardly biasing (preloading) the magnetic head 32 via the suspension arm 34. This pre-loading implements a desired contact or flying height between the magnetic head 32 and the surface of the disk 22. When the disk is rotated, the magnetic head 32 may make engagement with the surface of the disk or be supported by a cushion of air ("air bearing") which is generated by the moving disk. Drive circuitry 54 and detection circuitry 56 may be integrated in the actuator arm portion 36 of the integrated assembly 30A. Read and write signals may be transmitted between the magnetic head 32 and the drive electronics 50 via the drive circuitry 54 and the detection circuitry 56. The circuitry 54 and 56 comprises a portion of the drive electronics.

A prior art integrated magnetic head and suspension arm assembly 60, which will be referred to hereinafter as prior art integrated assembly 60, is illustrated in FIG. 2. The prior art integrated assembly includes first and second pole pieces 62 and 64, the second pole piece 64 having a vertical component 66. The pole pieces are connected at a back gap 68 and have pole tip portions which are separated by a gap 70. One or more layers of a coil 72 energizes the second pole piece 64 to transmit flux from the vertical component 66 into a magnetic medium, thence through the medium to the first pole piece 62. This is a perpendicular recording scheme since flux is transmitted through the medium in contrast to a fringing flux scheme which is known in the trade as longitudinal recording. The first and second pole pieces 62 and 64 and the coil 72 are integrated in a suspension arm 74. The prior art integrated assembly 60 is fabricated at the wafer level up to the point where the vertical component 66 is to be constructed. The wafer is then diced into rows and each row is lapped to form the desired gap 70, after which the vertical component 66 is formed by sputter deposition. In vertical recording heads, the gap 70 does not have to be made with the same precision that a gap of a longitudinal recording head, which will be described in more detail hereinafter. The prior art integrated assembly 60 is connected to an actuator arm 76 which rotates about an axis 78 of an actuator spindle. Mounted on the actuator arm 76 are coils 80 which are energized by drive electronics (not shown) via leads 48. The actuator further includes the magnet 46 so that when actuator coils 80 are energized the prior art integrated assembly 60 is rotated to rotate the magnetic head of the assembly over the surface of a rotating disk. The separate fabrication of the prior art integrated assembly 60, the actuator arm 76, and the actuator coils 80 followed by assembly of these components is labor intensive. It is this problem as well other problems which will become more apparent hereinafter that the present invention seeks to overcome.

The integrated assembly 30B, shown in FIG. 3, is another embodiment of the present invention. The embodiment 30B differs from the embodiment 30A, shown in FIG. 1, in that it does not employ the drive and detection circuitry 54 and 56. The integrated assembly 30B includes a first pole piece 92 and a second pole piece 94, the first pole piece 92 having a horizontal component 96 and the second pole piece 94 having a horizontal component 98. The horizontal components 96 and 98 form pole tips at a head surface 100 of the magnetic head 90 which are separated by a gap 102. The gap 102 is precisely formed by this film deposition and is typically on the order of 2–3 microns in width. A transducer coil 104 is provided between the first and second pole pieces 92 and 94 for transmitting flux between the pole tips 96 and 98 via the gap 102. Upon rotating a magnetic disk adjacent the head surface 100 the pole tips 96 and 98 operate magnetically to write and read signals on the magnetic disk. When writing, the flux between the pole tips 96 and 98 is essentially parallel to the surface of the magnetic disk. This is known as longitudinal recording. It is important to note that the magnetic head 90 of the integrated assembly in FIG. 3 can be made entirely at the wafer level as contrasted to fabricating the gap 70 and the vertical component 66 of the prior art integrated assembly shown in FIG. 2, at the row level. In the FIG. 3 embodiment, the magnetic head 90 is integrated in a suspension arm 34, which is, in turn, integrated with an actuator arm 106. The actuator arm 106 has a hole 108 through which a spindle (not shown) of an actuator extends along the vertical axis 42. Integrated within the actuator arm 106 is one or more actuator coils 38 which have ends terminating at pads 110 and 112. The coil 38 is energized by drive electronics (not shown) via leads 48 and the pads 110 and 112 which causes the suspension arm 34 and the magnetic head 90 to rotate about the spindle axis 42. This is a rotary actuator scheme which places the magnetic head over circular information and servo tracks on the magnetic disk 22 of FIG. 1. The suspension arm 34 and the actuator arm 106 may be one or more layers of alumina which provides at least one homogeneous support layer for the assembly. The left end of the integrated assembly 30B in FIG. 3 includes one or more insulation layers between various magnetic and conductive layers. The transducer coil 104 and the actuator coil 38 may be on the same level due to their fabrication which will be described in more detail hereinafter. It can be seen that many manufacturing steps are saved by integrating the magnetic head 90, the suspension 34, the actuator arm 106, and the actuator coil 38 according to the present invention.

In FIG. 4 there is shown an integrated assembly 30C of the present invention. The embodiment 30C is identical to the embodiment 30A, shown in FIG. 1, except the embodiment 30C does not include the bent beam 52. The embodiment 30C is the same as the embodiment 30B in FIG. 3 except the embodiment 30C further integrates in the assembly a silicon base 120, drive circuitry 54, detection circuitry 56 and optionally a release layer 122. A majority of the silicon base 120 may form the actuator arm 36 and may be provided with the hole 40 which receives an actuator spindle (not shown) for rotation about the spindle axis 42. The drive circuitry 54 and the detection circuitry 56 may be integrated circuits formed in the silicon base 120 and may be connected to ends of the transducer coil 104 via leads 124 and 126. The circuits 54 and 56 may be connected to drive electronics 50, shown in FIG. 1, via leads 128 and 130, pads 132 and 134 and leads 136 and 138. The drive circuit 54 and the detection circuit 56 are a portion of the drive electronics. The release layer 122 between the silicon base 120 and the actuator arm 36 may be included in the embodiments 30A and 30C of the present invention as a result of unique fabrication steps which may will be described in more detail hereinafter.

FIG. 5 is an isometric schematic illustration of the embodiment 30C shown in FIG. 4. FIG. 5 shows lead layers 140 which extend from the transducer coil 104 of the magnetic head, shown in FIG. 4, to the drive and detection circuits 54/56. It should be understood that the transducer coil 104, the leads 140 and the actuator coil 38 are all layers since they are fabricated by thin film technology which will be explained in detail hereinbelow.

FIG. 6 illustrates still another embodiment 30D of the present invention which does not integrate the magnetic head into the assembly. The embodiment 30D integrates only the suspension arm 34, the actuator arm 36, the actuator coil 38 and the silicon base 120 which includes drive and detection circuits 54 and 56. The integrated assembly 30D is essentially the same as the integrated assembly 30C except the magnetic head is a chiplet 142 which is added to the tip of the suspension 34 and connected to the drive and detection circuits 54/56 via the leads 140. The invention may further include an embodiment (not shown) identical to the embodiment 30D except the silicon base 120 and drive and detection circuits 54 and 56 are omitted. This embodiment would be similar to the embodiment 30B, shown in FIG. 3, except the magnetic head, which is a chiplet, is added to the assembly.

FIGS. 7, 8 and 9 illustrate two embodiments for preloading the suspension arm 34 of the integrated assembly.

FIGS. 7 and 8 illustrate a piezoelectric layer 144 which is mounted on top of the suspension arm 34 by any suitable means such as bonding or thin film deposition. Leads 146, schematically shown in FIG. 7, and a current source (not shown) energize the piezoelectric layer 144 to selectively downwardly bias the suspension 34 with a predetermined loading. FIG. 9 illustrates a bent beam 146 which is attached to the suspension arm 34 by any suitable means such as bonding. The bent beam 146, which may be resilient, downwardly biases the suspension arm 34 with a predetermined loading toward the surface of the rotating disk.

Methods of Construction

Figure 10B:
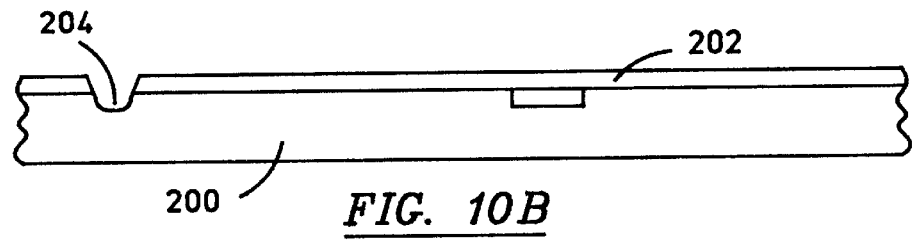

The method of construction will now be described for the integrated assembly 30C shown in FIG. 4. In FIG. 10A integrated drive circuitry 54 and 56 are fabricated in a silicon substrate 200. A silicon oxide (SiO) layer 202, in the order of 1 micron thick, is then deposited as an insulating layer for sealing the integrated circuits. In FIG. 10B, a localized region of the silicon oxide layer is removed by wet etching, such as hydrofluoric acid, or reactive ion etching, such as RIE with CF4. The exposed silicon 200 is then etched to form a depression 204 in the order of 8–10 microns deep. The depression 204 forms the shape and height of a wear pad for a thin film head which will be subsequently constructed on the silicon wafer 200.

Using photolithography techniques portions of the silicon oxide layer 202 extending from each side of the depression 204 may be removed by reactive ion etching. Then a release layer 206, which also is an etch protect layer, is deposited onto the bare silicon surface with a portion 208 of this layer overlapping onto the remaining silicon oxide layer 202. The release layer 206 may be chromium with a thickness in the order 0.5 microns.

Figure 10C:
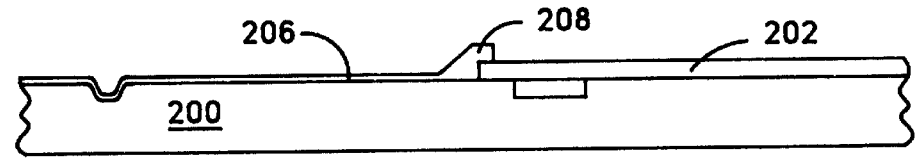
Figure 10D:
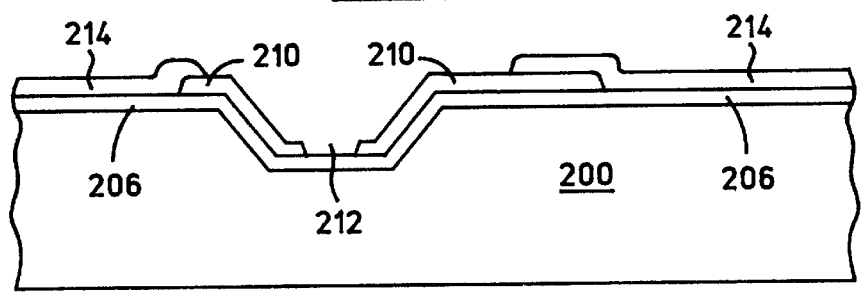
Figure 10E:
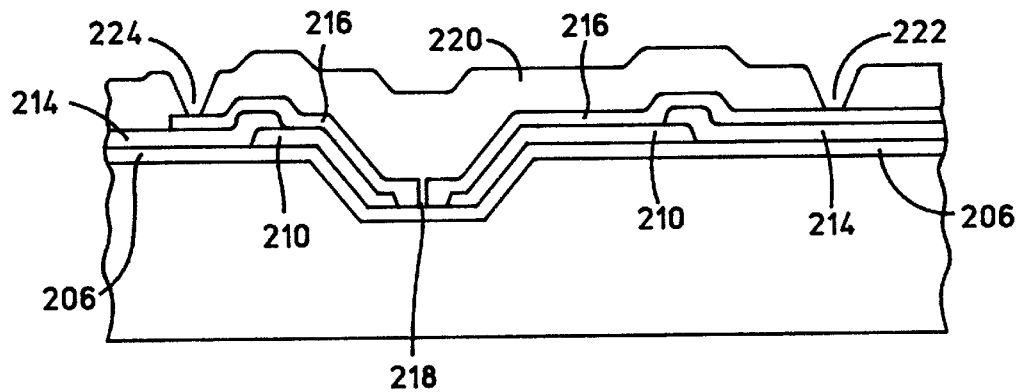
Figure 10F:
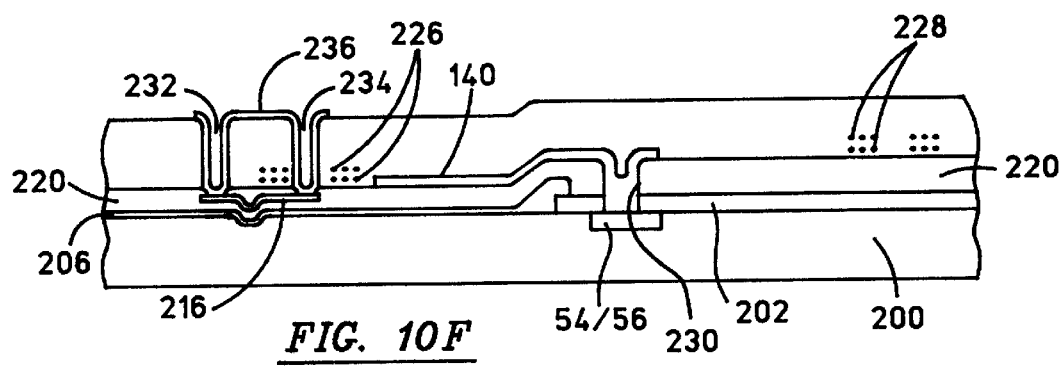

FIGS. 10D, 10E and 10F show the construction steps integrating the magnetic head into the assembly. As shown in FIG. 10D an initial layer of carbon 210, in the order of 3 microns thick, is deposited and patterned to remove carbon in the field and in a central wear pad region 212. Next an alumina layer 214, in the order of 3 microns thick, is deposited and patterned to remove alumina only a short distance on each side of the wear pattern region 212. As shown in FIG. 10E a bottom permalloy (NiFe) layer 216 may then be deposited and patterned to form a bottom yoke of the magnetic head with a precisely formed gap 218. The gap 218, which determines the resolution of the magnetic head, can be formed to submicron widths since it is formed by photolithography and thin film technologies. The thickness of the layer 216 may be on the order of 3–5 microns. An alumina (Al$_2$O$_3$) layer 220 is then deposited to seal the layer 216 and fill in the gap 218. Vias 222 and 224 may then be formed in the alumina layer 220 to the permalloy layer 216 for subsequent connection to a top yoke of the magnetic head which will be described hereinafter.

As shown in FIG. 10F one or more transducer coil layers 226 may be deposited by plating. Simultaneously, one or more actuator coil layers 228 may be deposited by plating.

This may be accomplished by forming a first photoresist mask and then simultaneously plating the first layers of the transducer coils 226 and the actuator coils 228. After removal of the photoresist mask, a layer of alumina is simultaneously deposited over the first layers.

Then a second photoresist mask is formed and the second layer of the transducer coils 226 and the actuator coils 228 are simultaneously plated. A second insulation layer of alumina may then be deposited simultaneously on top of the second layers. With this arrangement many processing steps are eliminated in the construction of these coils and insulation layers.

The result is that the first layers of the coils 226 and 228 are located substantially in a first common plane and the second layers of the coils 226 and 228 are located substantially in a second common plane.

After formation of the first coil layer of the transducer coils 226 and before formation of the first insulation layer thereover, a via 230 is provided in the alumina layer 220 for connecting terminal ends of the bottom transducer coil layer to the integrated circuits 54/56.

Figure 10G:
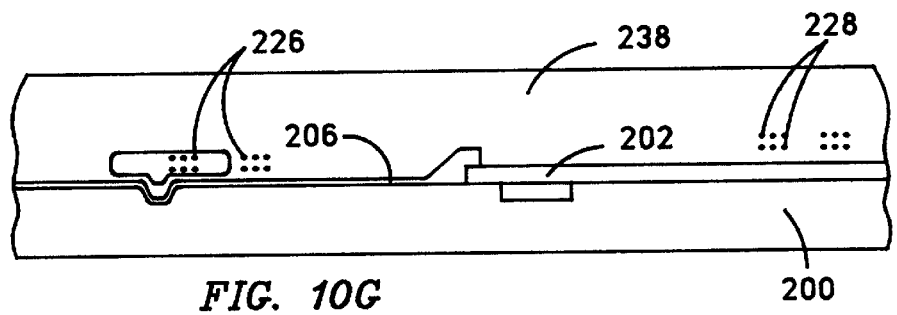

This connection is made by depositing conductive lead layers 140, one of which is seen in FIG. 10F and both of which are seen in FIG. 5. After formation of the second insulation layer above the second coil layers 226 and 228, vias 232 and 234 are made through the first and second insulation layers down to the bottom yoke 216 of the magnetic head. A top layer of permalloy 236 is then deposited to form the top yoke of the magnetic head, this top yoke making connections with the bottom yoke 216 via the vias 232 and 234. The top yoke 236 may be formed by plating after appropriate photoresist masking. As shown in FIG. 10G, a layer of alumina 238, in the order of 30–70 microns thick, is then deposited which completes the magnetic head as well as covering the actuator coils 228. This alumina layer forms the main strength for the suspension portion of the integrated assembly. It is a homogeneous support layer which spans the entire length of each embodiments of the invention described hereinabove.

Figure 10H:
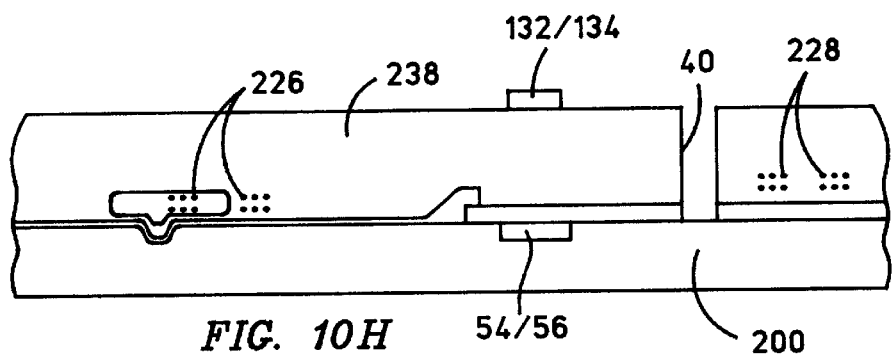
Figure 10H:
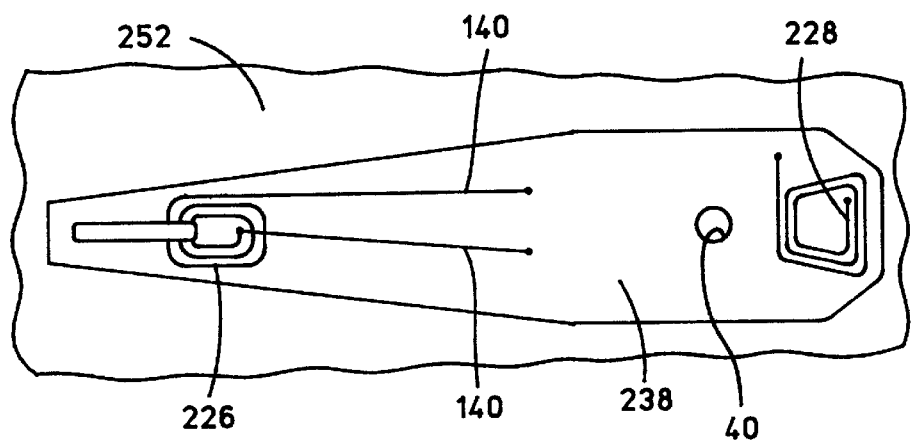

All of the previous steps have been performed at the wafer level for multiple integrated assemblies. The next fabrications steps form discrete units of the integrated assemblies. The alumina layer 238 about each assembly is etched away to the silicon dioxide layer 202 and the release layer 206 by any suitable etchant such as EDTA. Simultaneously the hole 40 is etched through the alumina layer 238. After etching the alumina layer 238, the silicon dioxide layer 202 and the release layer 206 in the field outside the assembly is removed by etching leaving silicon dioxide and release layer portions under each assembly, as shown in FIG. 10H. The last etching step completed the hole 40 down to the silicon layer 200.

Figure 10I:
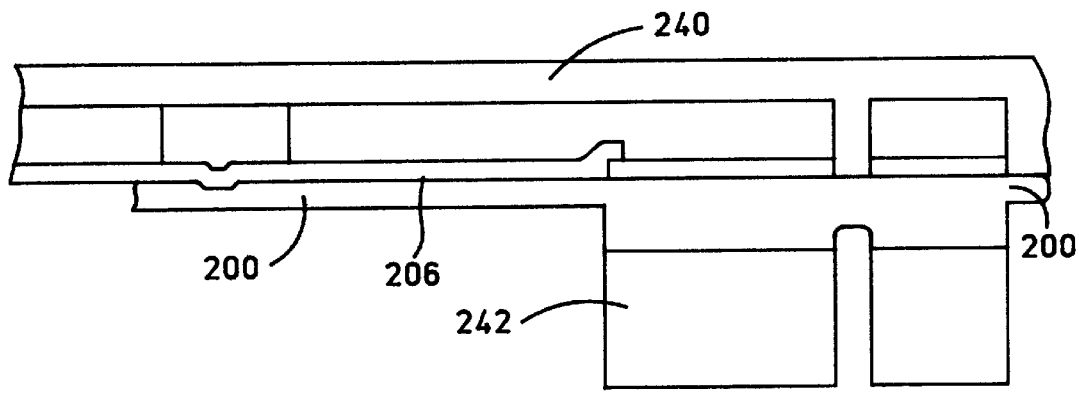
Figure 10J:
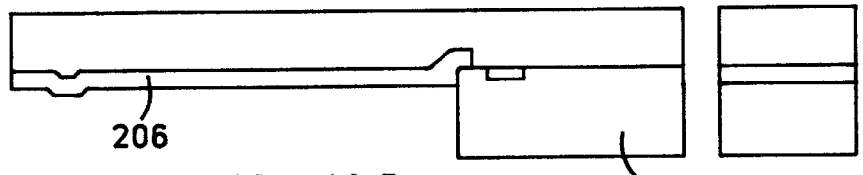
Figure 10K:
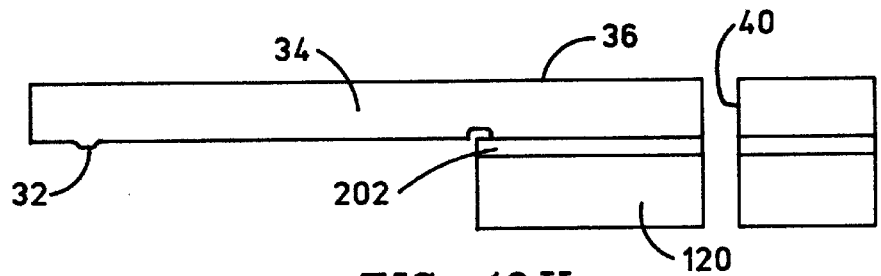

In FIG. 10I the top of the wafer is protected with a photoresist layer 240 and the bottom of the wafer is patterned with a photoresist layer 242. Etching is then employed to remove the silicon substrate 200 below the suspension of the integrated assembly. The etching step is shown intermediate its beginning and end after about etching two-thirds of the silicon 200 below the suspension. The etch, which may employ sodium hydroxide, terminates at the release layer 206. The result of these processing steps are individual integrated head assemblies, one of which is illustrated in FIG. 10J. In FIG. 10K the release layer 206 is removed with a standard chromium etchant. This leaves a head surface which is formed by the bottom yoke 216, the gap 218 and carbon wear layer portions 210 (see FIG. 10E).

Figure 10L:
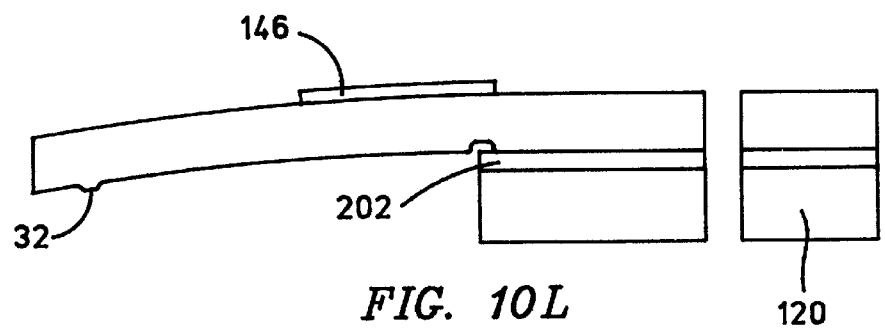

Pre-loading of the suspension may be accomplished by the step shown in FIG. 10L. A beam 146, also shown in FIG. 9, is pre-stressed to force the suspension in a downwardly direction. As stated hereinabove, this member could optionally be the piezoelectric layer 144 shown in FIGS. 7 and 8. The beam 146 or the piezoelectric layer 144 may be deposited or bonded on the suspension 34 as shown in FIG. 10G.

Figure 11A:
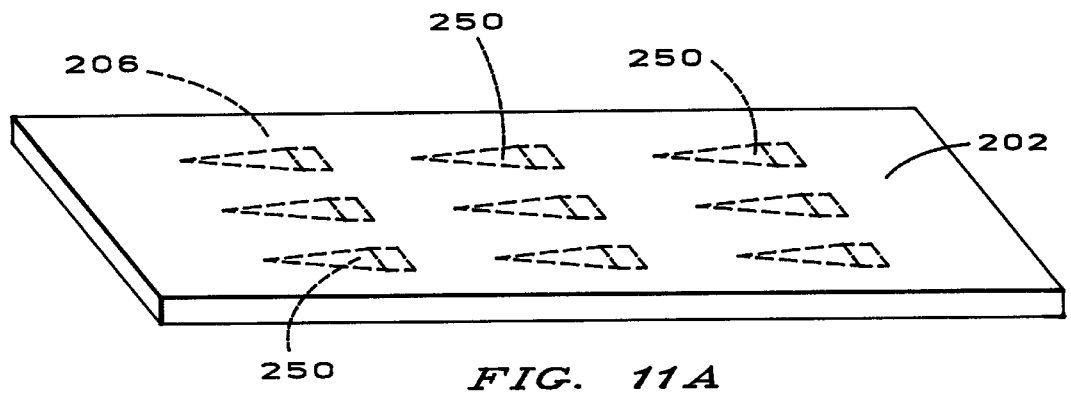
FIGS. 11A–11C illustrate a series of steps in a batch fabrication of the present invention.
Figure 11B:
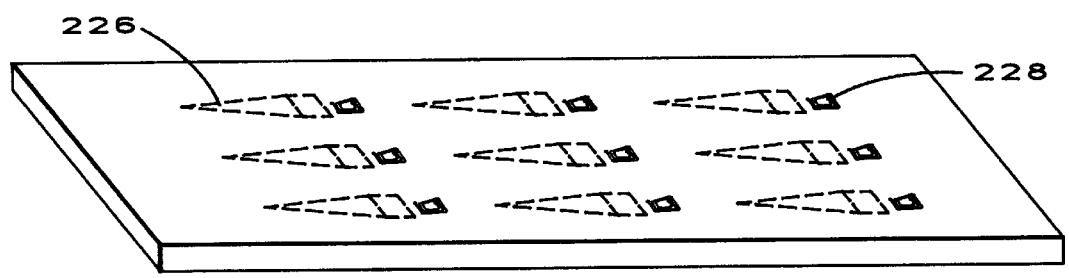
Figure 11C:
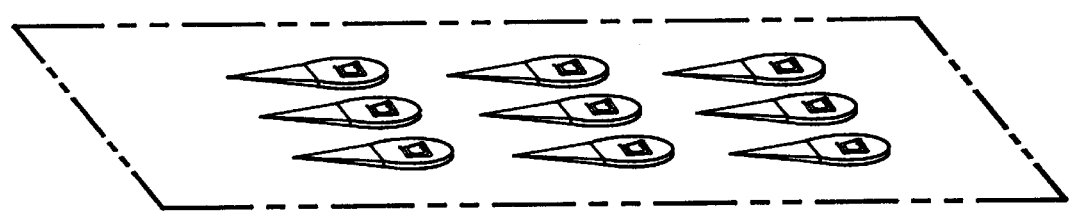

FIG. 11A shows batch fabrication of a plurality of integrated assemblies with their sites being shown at 250. FIG. 11A is after the formation of the release layer 206 for each assembly (see FIG. 10C). FIG. 11B shows batch fabrication after simultaneous formation of the transducer coil layers 226 (not shown) and the actuator coil layers 228 (see also FIG. 10F). FIG. 11C illustrates the individual integrated assemblies after etching the silicon substrate 200 (see also FIGS. 10I and 10J). The individual integrated assemblies are then completed by removing the release layer as illustrated in 10K.

Figure 12A:
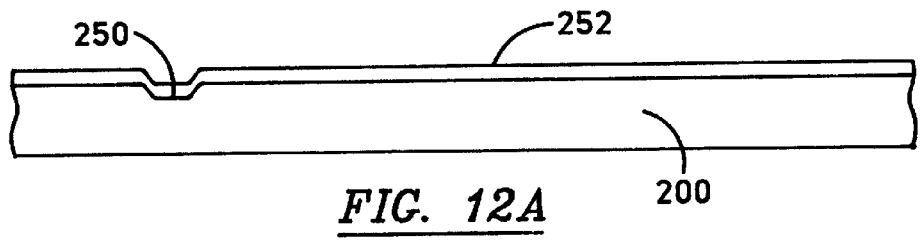
FIGS. 12A–12E illustrate a series of steps which modify the steps shown in FIGS. 10A–10L for fabricating the embodiment of the invention shown in FIG. 3.
Figure 12B:
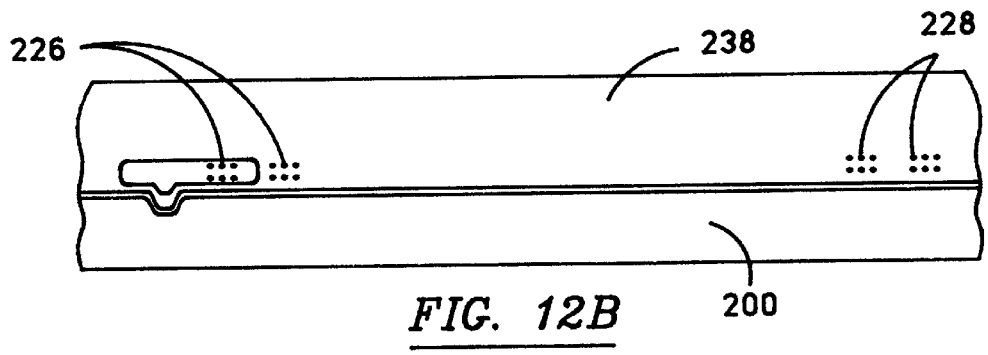

Next is described a method of fabricating the integrated assembly 30B of FIG. 3. The fabrication steps are shown in FIGS. 12A through 12E. Some of these steps are common to the fabrication steps of the integrated assembly 30A shown in FIGS. 10A through 10J. Accordingly, FIGS. 10A–10J will be used in combination with FIGS. 11A through 11E to describe the process. As shown in FIG. 12A, the substrate 200, which may be silicon, is provided with a depression 250. A release layer 252, which may be copper on the order of 1–2 um thick, is then formed on top of the silicon substrate 200. This takes us up to the step described for FIG. 10C hereinabove. Next, the same process steps as described for FIGS. 10D, 10E and 10F are implemented which results in an assembly illustrated in 12B which is identical to the assembly illustrated in 10G except the release layer 252 is the only layer separating the alumina 238 from the silicon substrate 200.

Figure 12C:
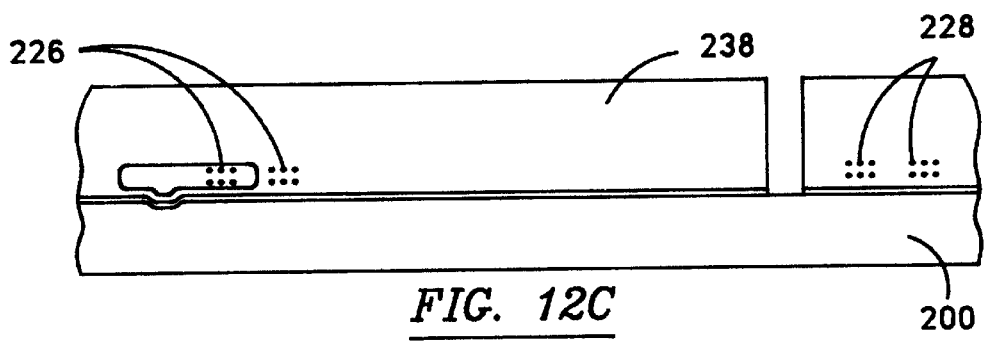
Figure 12C:
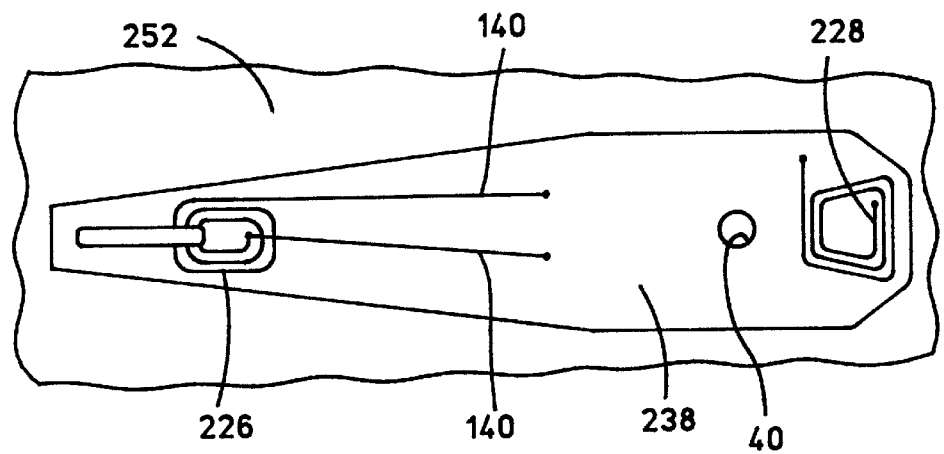
Figure 12D:
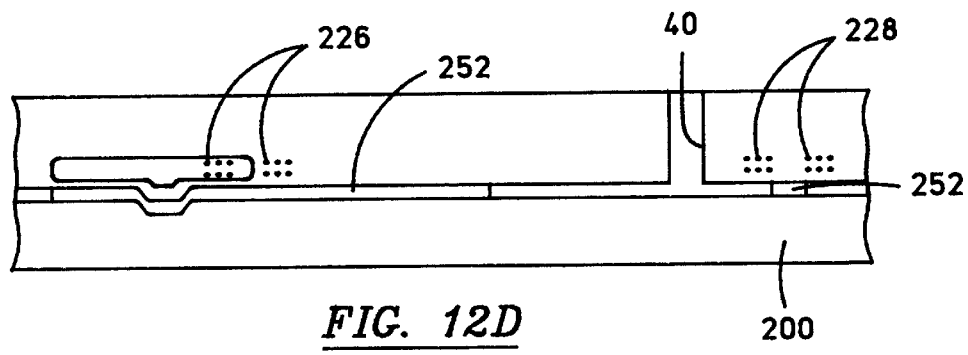

The next step is to etch away the alumina 238 down to the release layer 252 which results in individual integrated assemblies, one of which is illustrated in FIG. 12C, which is similar to the steps forming the integrated assembly in FIG. 10H except the etching is down to the release layer 252 instead of down to the silicon substrate 200. As in the steps involved with FIG. 10H, the spindle hole 40 is simultaneously formed. A suitable etchant for this process is EDTA.

Figure 12E:
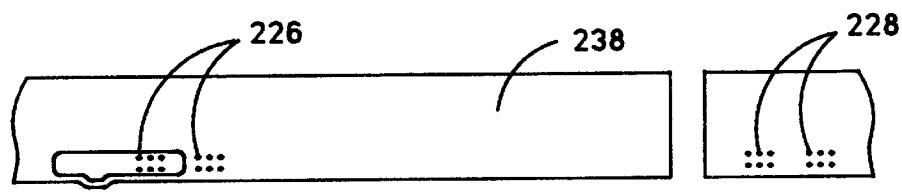

Next, the entire wafer is placed in an etching solution, such as a copper etchant, that dissolves the release layer 252 and separates the individual integrated assemblies from the silicon substrate. This step is shown intermediate its process in FIG. 12D and is shown after completion in FIG. 12E. The final product is illustrated in FIGS. 12E and 3. The alumina beam which makes up the suspension and the actuator arm can be 50–75 microns thick. If desired, the suspension of the integrated assembly can be deflected by the addition of a stressed beam as discussed hereinabove.

Another embodiment 300 of the present invention is illustrated in FIG. 14. The embodiment, which is a laminated integrated assembly, is fabricated from the planar laminate 302 shown in FIG. 13. This planar laminate and the fabrication of the laminate integrated assembly 300 will be described in more detail hereinafter. As shown in FIG. 14, the assembly 300 has a suspension region which extends from a first end 304 to an intermediate plane 306 and an actuator region which extends from the plane 306 to a second end 308. The suspension and actuator regions are contiguous with respect to one another. A homogeneous support layer 310 extends between the first and second ends 304 and 308 so as to be a continuous component between these ends. The outer periphery of the suspension and actuator regions, shown in FIG. 14, is the outer periphery of the homogeneous support layer 310 with the exception of a flex cable 312 which will be described in more detail hereinafter. The inner peripheries of the homogeneous support layer 310 are openings 314, 316, 318 and 320. The opening 314 is a registration hole for accurately mounting a magnetic head 322 (see FIG. 15) during assembly. The opening 316 forms the homogeneous support layer into hinges 324 which may be bent to pre-load the magnetic head 322 toward a rotating magnetic disk (see FIG. 1). The hinges 324 may be less thick than the remainder of the homogeneous support layer so as to provide a desired hinging action. Further, the homogeneous support layer 310 is also thinner in an area 325 adjacent the end 304 so as to provide additional flexure in roll and pitch for the head during its operation adjacent a rotating magnetic disk (see FIG. 1). The opening 318 is a circular opening for receiving a spindle (not shown) of an actuator. The opening 320 is provided for weight reduction.

Figure 17:
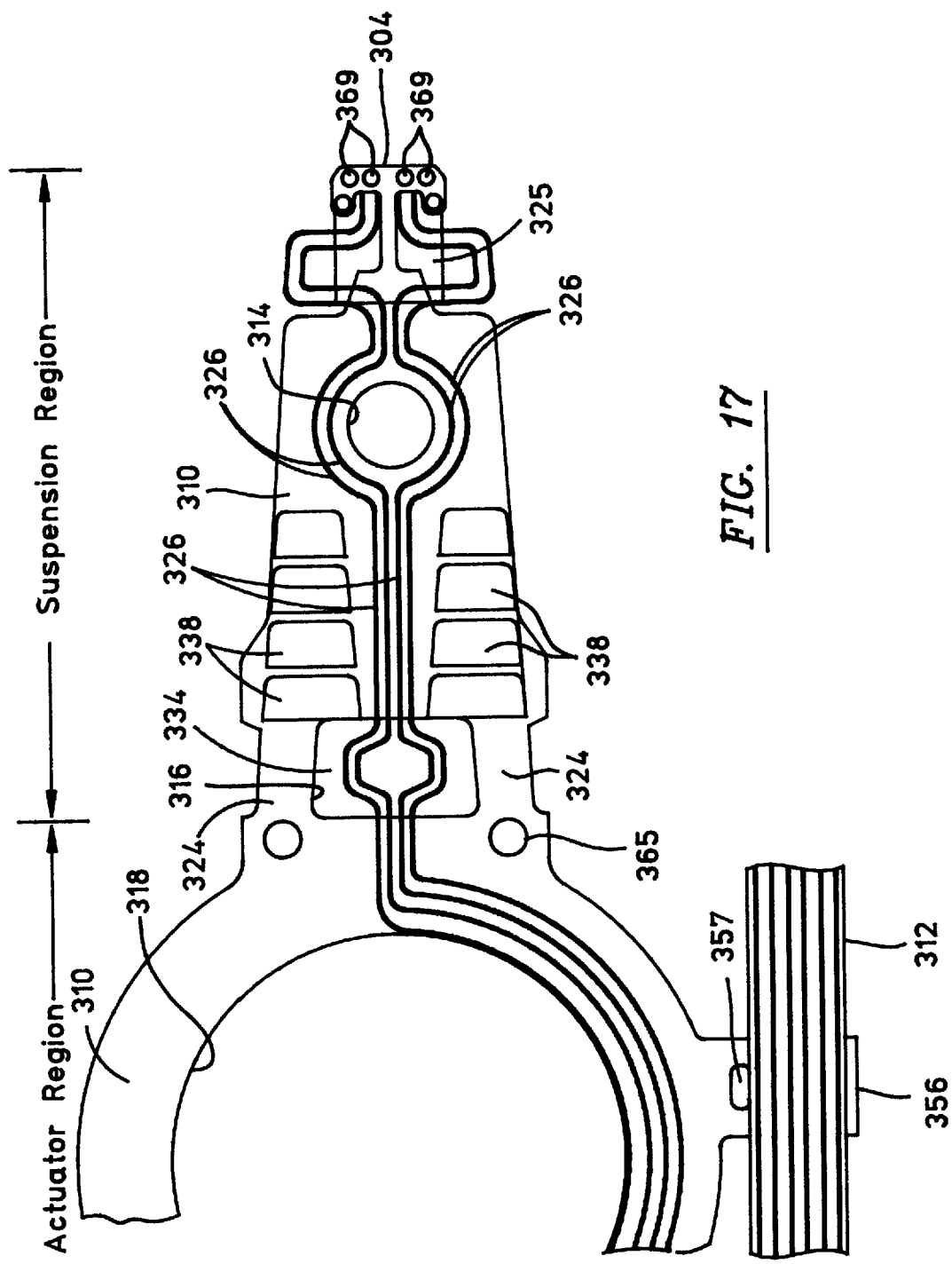
FIG. 17 is a top planar enlarged illustration of the right portion of FIG. 14.

As shown in FIGS. 14 and 17, transducer lead layers 326 extend substantially from the end 304 through the suspension region, thence into the actuator region around the circular opening 318, thence into the flex cable 312. Also mounted on the homogeneous support layer 310 in the actuator region is an actuator coil layer 328 which has terminal ends 330. Actuator coil layers 332, which extend from these terminals 330, also extend into the flex cable 312 along with transducer lead layers 326. The transducer lead layers 326 and the actuator coil layer 328 lie substantially in a common plane in the actuator region. The transducer lead layers 326 in the suspension and actuator regions are substantially in a common plane before the hinges 324 are bent to provide the aforementioned pre-loading. The number of transducer lead layers 326 are divided and looped about the area 325, the circular opening 314 and the area 316. The loops in the area 325 and 316 are provided for stress relief of the transducer lead layers when the thinner portions of the homogeneous support layer 310 undergo flexure during operation.

An insulative flexible layer, which is partially shown at 334, is sandwiched between the transducer lead layers 326 and the homogeneous support layer 310 in the suspension and actuator regions. The insulative flexible layer is also sandwich between the actuator coil layer 328 and the homogeneous support layer 310 in the actuator region. The insulative flexible layer 334 is located everywhere where the transducer lead layers 26 and the actuator coil layer 328 are located including the flex cable 312. The flexible layer may be continuous from the first end 304 to the second end 308 and also may be located everywhere where the homogeneous support layer 310 is located with the exceptions of the area 325 and the hinges 324. For instance, a flexible layer portion 336 may extend from the area 325 to the opening 316 in the suspension region in intimate engagement with the homogeneous support layer 310. Discrete copper pads 338 may be located on the flexible layer portion 336 for providing a desired dampening effect of the suspension region during operation.

Shown in FIG. 14 is another actuator coil assembly 340 which includes an actuator coil layer 342. The coil layer 342 has terminals 344 which will mate with terminals 330 of the actuator coil layer 328. The actuator coil layer 342 is mounted on a support layer 346 which may be homogeneous with homogeneous support layer 310 via a homogeneous support layer extension 348. The extension 348 allows the actuator coil layer 342 to be folded over on top of the actuator coil layer 328 with the terminals 344 being positioned opposite the terminals 330. Before the folding operation takes place solder balls are formed at the terminals 330 and locations 350 inside the actuator coil layer 328. The solder balls are formed by placing a stencil over the area to be worked and then applying solder paste on the areas 330 and 350. After removal of the stencil, heat at approximately 125° C. is applied which causes the solder paste to form hemispherical shapes. The actuator coil layer 342 is then folded on top of the actuator coil layer 328 and heat is once again applied causing the solder balls to connect terminals 330 and 344 and to provide solder spacers between the actuator coil layers 328 and 342, the spacers being located at and between the areas 350 of the assembly 300 and the areas 352 of the coil assembly 340. Accordingly, the solder balls connect the actuator coil layers 328 and 342 at the terminals 330 and 344 as well as spacing the coil layers from one another so that they are electrically isolated except for said terminals. The resulting combined actuator coil assembly (300 and 340) is shown at 354 in FIG. 15. A description of fabrication with solder balls is in commonly owned U.S. Pat. No. 4,761,699 which is incorporated by reference.

Figure 18:
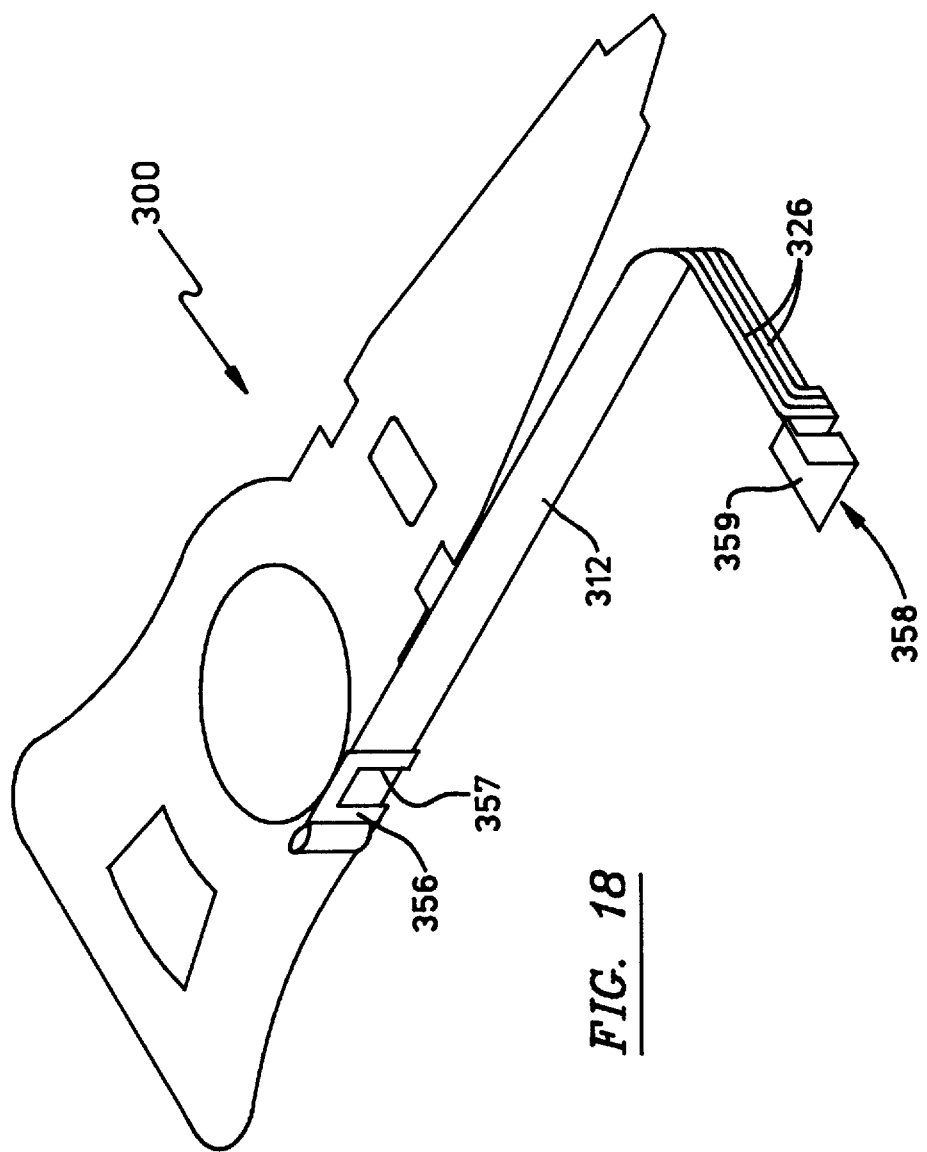
FIG. 18 is an isometric schematic illustration of the FIG. 14 embodiment with a flex cable extending to drive electronics (not shown).

The aforementioned flex cable 312 is shown in FIGS. 14, 17 and 18. The flex cable 312 includes the transducer lead layers 326 and actuator coil layers 328 which extend to drive electronics 50 (see FIG. 1). The homogeneous support layer 310 is not located within the flex cable 312 so that the flex cable 312 will have the desired flexure to the drive electronics as the assembly pivots about an actuator spindle (not shown) in the spindle hole 318. Accordingly, there is no homogeneous support layer 310 in the flex cable 312 from the outer periphery of the spindle hole 318 all the way to the drive electronics. The homogeneous support layer may extend from the outer periphery of the spindle hole 318 to a location in close proximity to a tab 356 shown in FIGS. 17 and 18. The tab 356 is an extension of the homogeneous support layer 310 and extends laterally a distance to sufficiently support the flex cable 312 before the flex cable 312 extends in the direction of the drive electronics. As shown in FIG. 17, the tab 356 may have an opening 357 which allows the tab to be folded upwardly with respect to the plane of the support layer 310. This twists the flex cable 312 to a vertical position as shown in FIG. 18. The flex cable 312 extends to a connector 358 which is adapted to connect to the drive electronics. The connector 358 has a portion of the homogeneous layer 310 at 359 so that it can be bent to substantially a 90° angle as shown in FIG. 18. The leads 326 extend under the connector 358 for connection to the drive electronics.

Figure 19A:
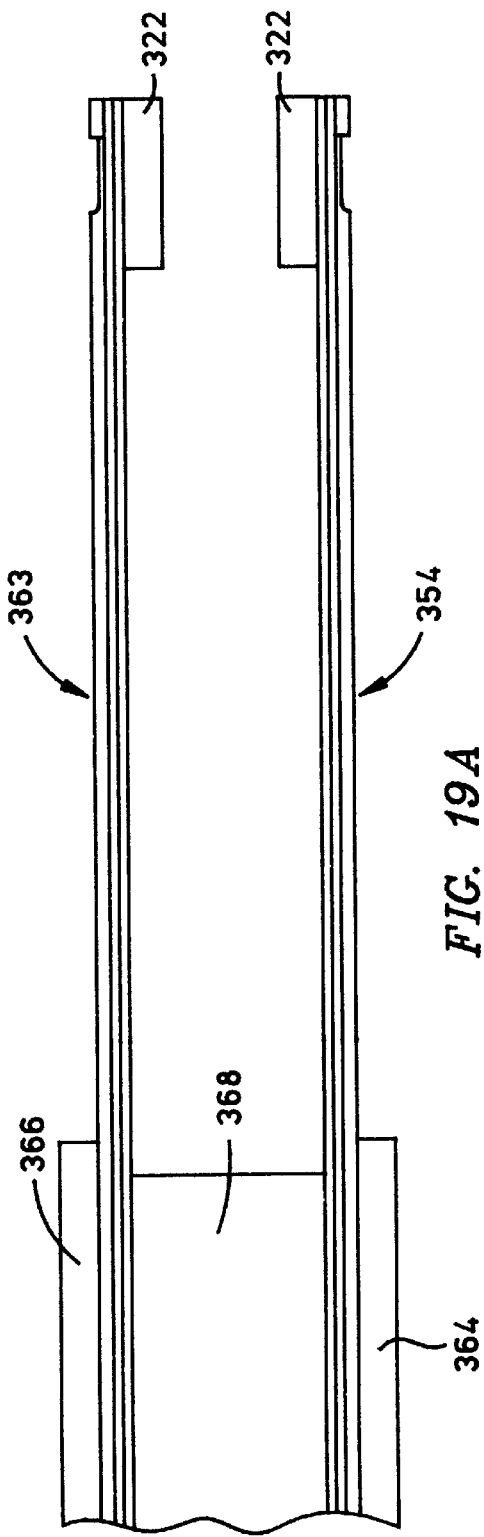
FIG. 19A is an enlargement of the right portion of FIG. 15.
Figure 19B:
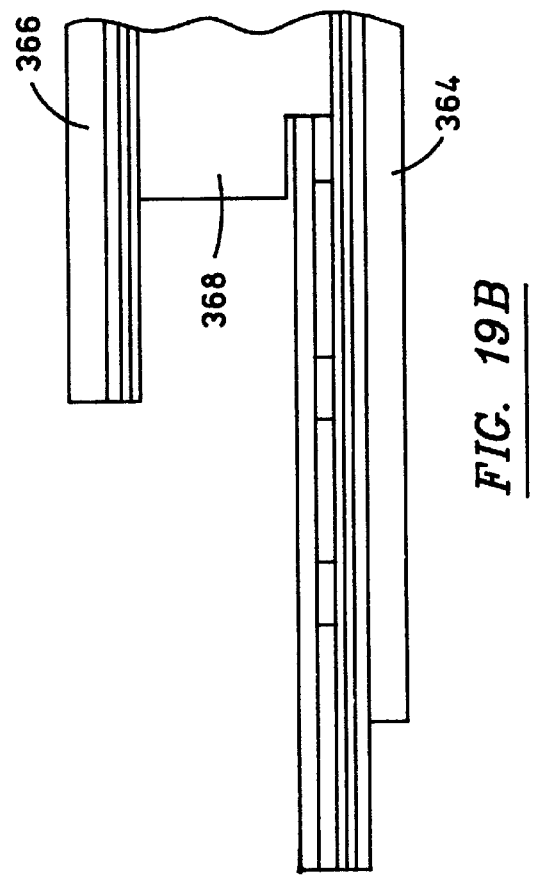
FIG. 19B is an enlargement of the left portion of FIG. 15.

FIGS. 15, 16, 19A and 19B illustrate magnetic head and actuator assemblies for reading and/or writing opposite sides of a rotating magnetic disk. The combined assembly of FIG. 14 is shown at 354 in FIGS. 15, 19A and 19B. An assembly 363, which is the same as assembly 300 except for the actuator coil layer 328 and its support, is also shown in FIGS. 15, 19A and 19B. The combination 354 is connected to a support plate 364 by any simple means such as laser spot welding the homogeneous support layer 310 thereto at eight different locations shown generally at 365 in FIG. 14. The assembly 363 is joined to a support plate 366 in substantially the same manner. The assemblies 354 and 363 are then combined as shown in FIG. 15 and are spaced from one another by a spacer 368 which may be connected to homogeneous support layers of the assemblies by any simple means such as bonding. A slider/magnetic head 322 is connected to the terminal end of each of the assemblies 354 and 363 by any simple means such as bonding. Pads (not shown) of the magnetic heads 322 are connected to the transducer lead layers 326 via pads 369 at the terminal end of the suspension as shown in FIG. 17.

It is preferred that the homogeneous support layer 310 is stainless steel, that the flexible layer 334 is a resin such as polyamide, and that the transducer lead layers 326 and the actuator coil layer 328 are copper. The assemblies 300 and 340 in FIG. 14 may be batch fabricated from the planar laminate 302 shown in FIG. 13. The planar laminate 302 includes a stainless steel (#304) layer 70 which is 2 mils thick, a copper (C7025) layer 72 which 17.8 microns thick and a polyamide layer 74 which is sandwiched between the layers 70 and 72 and is 16.5 microns thick. This laminate and the methods of fabricating it into various components are fully described in commonly owned U.S. Pat. No. 4,996,623 which is incorporated by reference herein.

Figure 13:
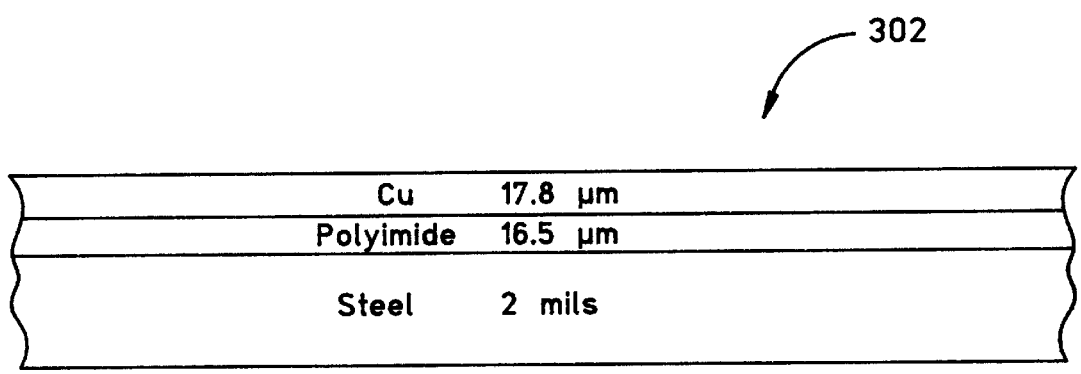
FIG. 13 is a vertical section of a planar laminate employed to fabricate another embodiment of the invention shown in FIG. 14.
Figure 22:
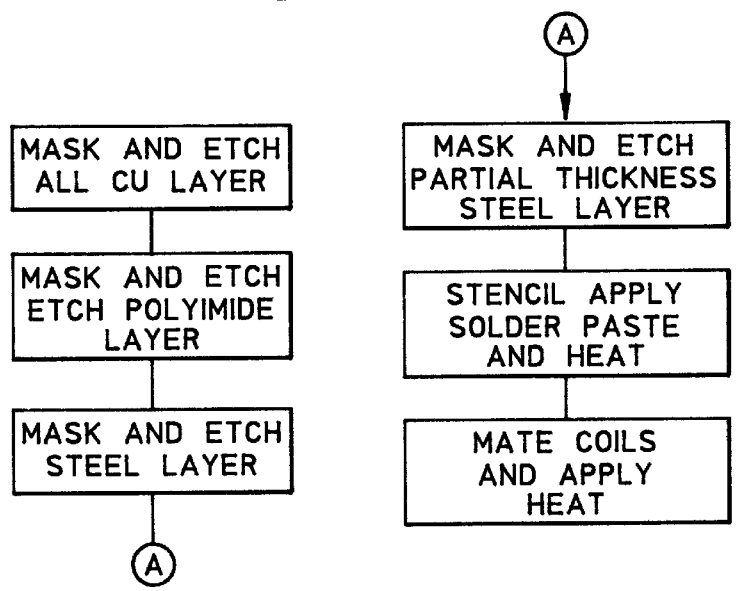
FIG. 22 is a block diagram illustrating the steps involved in batch fabricating the FIG. 14 embodiment.

An exemplary method of constructing the assemblies 300 and 340, shown in FIG. 14, from the planar laminate 302, shown in FIG. 13, is illustrated in FIG. 22. The first step is to mask and etch the copper layer 72 which is shown in FIG. 13. After this step, all the copper features of the assemblies are formed, namely the transducer lead layers 326, the actuator coil layers 328 and 342 and the copper pads 338. The next step is to mask and etch the polyamide layer 74 shown in FIG. 13. This step etches away all of the polyamide except the polyamide under all of the copper features described hereinabove. The next step is to mask and etch the steel layer 70 shown in FIG. 13. This results in the outside configurations of the assemblies 300 and 340 in FIG. 14 as well as removing steel layer portions to provide the opening 314, the area 334, the opening 318, the opening 320 and an opening 370 in the assembly 340. This step also results in removing the steel layer from the flex cable 312, forms the outside perimeter of the tab 356 shown in FIG. 17, and the aperture 358 in the tab. The next step is to mask and etch a partial thickness of the steel layer 70. This results in lessening the thickness of the homogeneous support layer 310 in the areas 324 and 325. The next step is to stencil, apply solder paste and heat as discussed hereinabove. This results in solder balls at locations 330 and 350 (see FIG. 14). The actuator coil layer 342 of the assembly 340 is then mated with the actuator coil layer 328 of the assembly 300 and heat is applied to make connections between the actuator coil layers and provide solder ball spacing between the coil layers so as to electrically isolate them from each other.

Figures 20A, 20B:
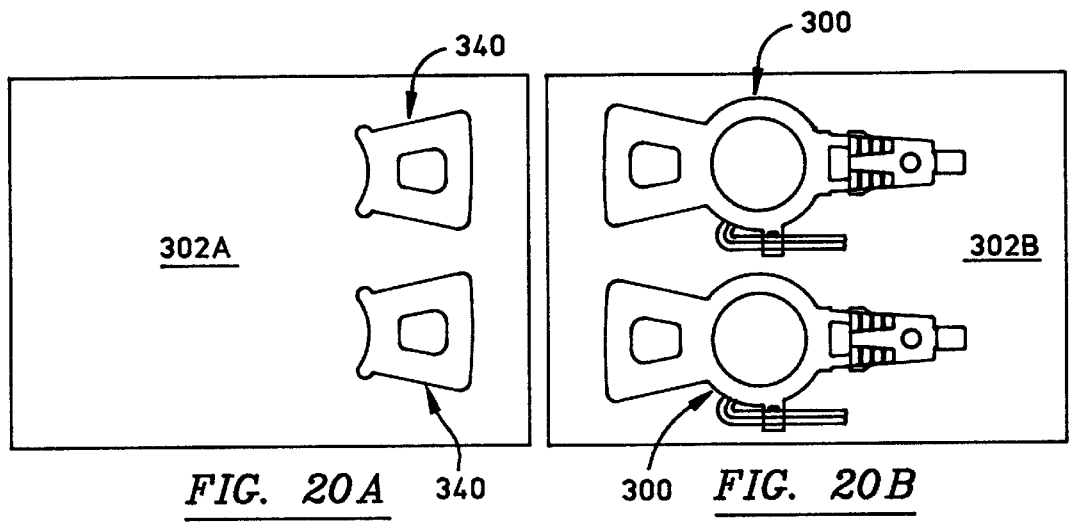
FIGS. 20A and 20B are schematic illustrations of an exemplary batch fabrication of the FIG. 14 embodiment.
Figure 21:
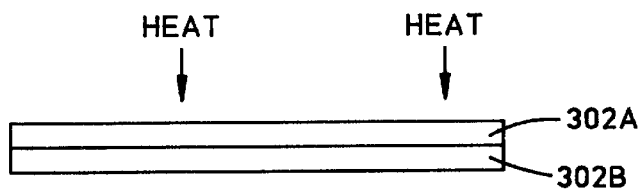
FIG. 21 is a side illustration of the two panels in FIGS. 21A and 21B joined together as one of the last steps in the fabrication.

A hundred to two hundred assemblies 300 and 340 of FIG. 14 can be batch fabricated on a planar laminate 302. If the assemblies are fabricated with the hinge 348 this hinge will be employed for folding the actuator coil layer 342 on top of the actuator coil layer 328 to complete the last steps in process. A batch fabrication which may result in a higher throughput is shown in FIGS. 20A and 20B where a plurality of assemblies 340 are fabricated on a planar sheet 302A and a plurality of assemblies 300 are fabricated on another planar laminated sheet 302B. The assemblies 340 and 300 are arranged on the sheets so that they will mate with one another. In the last steps of the assembly the sheet 302A in FIG. 20A is turned over on top of the sheet 302 in FIG. 20B and heat is applied simultaneously to all of the assemblies, as shown in FIG. 21, to join several hundred assemblies 340 and 300 at one time.

Obviously many modifications and variations of the present invention are possible in light of the above teachings and are to be limited only by the following claims.

We claim:

1. A method of making an elongated integrated magnetic head assembly which has a suspension region which extends from a first end of the assembly to an intermediate location of the assembly and an actuator arm region which extends from the intermediate location to a second end of the assembly comprising the unordered steps of:

forming a magnetic head including a transducer coil layer in the suspension region;

forming transducer lead layers in the suspension region that are connected to the transducer coil layer;

forming an actuator coil layer in the actuator arm region; and forming at least one homogeneous support layer which extends from said first end to said second end to provide support for all layers between said first and second ends.

2. A method as claimed in claim 1 including the step of:

forming a hole in the homogeneous support layer in the actuator arm region between the suspension region and the actuator coil layer for receiving a spindle of an actuator.

3. A method as claimed in claim 1 including the step of:

embedding the magnetic head and transducer coil in said homogeneous support layer.

4. A method as claimed in claim 1 including the step of:

the homogeneous support layer being elongated along a lengthwise direction;

mounting a layer of bent material on the homogeneous support layer which bends the suspension region of the homogeneous support layer along the lengthwise direction of the homogeneous support layer.

5. A method as claimed in claim 1 including the steps of:

forming the transducer lead layers, the actuator coil layer and the homogeneous support layer on a silicon substrate;

forming integrated processing circuitry in the silicon substrate; and connecting the transducer coil layer to said circuitry.

6. A method of making an elongated integrated assembly which has a suspension region which extends from a first end of the assembly to an intermediate location of the assembly and an actuator arm region which extends from the intermediate location to a second end of the assembly comprising the unordered steps of:

providing a substrate which has a top surface;

forming a depression in the top surface of the substrate;

forming a release layer in the depression and on the top surface of the substrate;

forming a first insulation layer on top of the release layer from said first end to said second end with a gap via to the release layer;

forming a bottom magnetic yoke in the suspension region of the assembly on top of the first insulation layer with a magnetic gap located in said gap via, the bottom magnetic yoke having a back gap region;

forming a second insulation layer on top of the bottom magnetic yoke and on top of the first insulation layer from said first end to said second end;

simultaneously forming on top of the second insulation layer at least one transducer coil layer about said back gap in the suspension region and at least one actuator coil between the transducer coil and said second end in the actuator arm region;

forming a third insulation layer on top of the transducer coil layer and actuator coil layer from said first end to said second end;

making a pair of vias through said third insulation layer and said second insulation to said bottom magnetic yoke, one of the vias being located in said back gap region;

forming a top magnetic yoke on top of said third insulation layer and connected to the bottom magnetic yoke through said pair of vias; and forming a homogeneous support layer on top of the top magnetic yoke and said third insulation layer from said first end to said second end for supporting all layers.

7. A method as claimed in claim 6 including the step of:

forming a hole through the homogeneous support layer and all insulation layers to receive a spindle of an actuator.

8. A method as claimed in claim 6 including the step of:

mounting a layer of bendable material on the homogeneous support layer to bend the suspension region of the homogeneous support layer.

9. A method as claimed in claim 6 wherein the step of forming the first insulation layer comprises forming a layer of carbon in said depression with a magnetic via extending therethrough.

10. A method as claimed in claim 6 including:

the step of forming said release layer comprises forming the release layer on the substrate from said first end to said second end; and after forming all layers removing the release layer to release the substrate from all layers attached to the substrate.

11. A method as claimed in claim 10 including the step of:

forming a hole through the homogeneous support layer and all insulation layers to receive a spindle of an actuator.

12. A method as claimed in claim 6 including:

the step of forming the release layer comprises the step of forming the release layer in substantially only the suspension region so that the release layer is only on top of a portion of the substrate;

removing said portion of the substrate; and removing the release layer.

13. A method as claimed in claim 12 including the step of:

forming a hole through the homogeneous support layer and all insulation layers to receive a spindle of an actuator.

14. A method of making an elongated integrated assembly which has a suspension region which extends from a first end of the assembly to an intermediate location of the assembly and an actuator arm region which extends from the intermediate location to a second end of the assembly comprising the unordered steps of:

forming transducer lead layers in the suspension region;

forming an actuator coil layer in the actuator arm region;

forming at least one homogeneous support layer which extends from said first end to said second end to provide support for all layers between said first and second ends;

forming a transducer coil layer in the suspension region; and said forming the actuator coil layer and said forming the transducer coil layer being performed simultaneously.

15. A method as claimed in claim 14 including the step of:

forming a hole in the homogeneous support layer between the suspension region and the actuator coil layer for receiving a spindle of an actuator.

16. A method as claimed in claim 14 including the step of:

mounting a layer of bendable material on the homogeneous support layer for bending the suspension region of the homogeneous support layer.

17. A method as claimed in claim 14 including the steps of:

forming the transducer lead layers, the actuator coil layer and the homogeneous support layer on a silicon substrate;

forming integrated processing circuitry in the silicon substrate; and connecting the transducer coil layer to said circuitry.

18. A method of making an elongated integrated assembly which has a suspension region which extends from a first end of the assembly to an intermediate location of the assembly and an actuator arm region which extends from the intermediate location to a second end of the assembly comprising the unordered steps of:

forming transducer lead layers in the suspension region;

forming an actuator coil layer in the actuator arm region;

forming at least one homogeneous support layer which extends from said first end to said second end to provide support for all layers between said first and second ends;

providing a substrate;

forming a release layer between the substrate and the homogeneous support layer; and after forming all layers releasing the homogeneous support layer from the substrate.

19. A method as claimed in claim 18 including the steps of:

forming the release layer from said first end to said second end; and removing the release layer to release the transducer coil layer, the actuator coil layer and the homogeneous support layer from the substrate.

20. A method as claimed in claim 19 including the steps of:

forming a transducer coil layer in the suspension region;

said forming the actuator coil layer and said forming the transducer coil layer being performed simultaneously; and forming a hole in the homogeneous support layer between the transducer coil layer and the actuator coil layer for receiving a spindle of an actuator.

21. A method as claimed in claim 19 including:

the step of providing a substrate includes providing a silicon substrate;

forming drive and detection circuity in the silicon substrate;

forming a transducer coil layer in the suspension region;

connecting the transducer coil layer to the drive and detection circuitry;

the step of forming a release layer includes forming the release layer substantially only in the suspension region so that the release layer is between only a portion of the silicon substrate and the homogeneous support layer; and in an unordered sequence removing said silicon substrate portion and said release layer.

22. A method as claimed in claim 21 including the steps of:

said forming the actuator coil layer and said forming the transducer coil layer being performed simultaneously; and forming a hole in the homogeneous support layer between the transducer coil layer and the actuator coil layer for receiving a spindle of an actuator.

23. A method as claimed in claim 22 including the step of:

mounting a layer of bendable material on the homogeneous support layer for bending the suspension region of the homogeneous support layer.

\* \* \* \* \*